(12) United States Patent
Wallace et al.

(10) Patent No.: US 6,588,212 B1
(45) Date of Patent: Jul. 8, 2003

(54) COMBUSTION TURBINE FUEL INLET TEMPERATURE MANAGEMENT FOR MAXIMUM POWER OUTLET

(75) Inventors: Paul S. Wallace, Katy, TX (US); Kay A. Johnson, Missouri City, TX (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/946,953

(22) Filed: Sep. 5, 2001

(51) Int. Cl.[7] .............................. F02C 6/18; F02C 7/08
(52) U.S. Cl. .................... 60/772; 60/780; 60/39.12; 60/736
(58) Field of Search ................ 60/777, 775, 39.12, 60/39.182, 736, 780

(56) References Cited

U.S. PATENT DOCUMENTS

| | | | |
|---|---|---|---|
| 5,044,152 A | 9/1991 | Hoizumi et al. | 60/39.03 |
| 5,117,623 A * | 6/1992 | Arundale | 48/197 R |
| 5,175,993 A | 1/1993 | Raiko et al. | 60/39.05 |
| 5,345,756 A * | 9/1994 | Jahnke et al. | 252/373 |
| 5,934,063 A | 8/1999 | Nakhamkin | 60/39.02 |
| 6,038,849 A | 3/2000 | Nakhamkin et al. | 60/39.05 |
| 6,343,462 B1 * | 2/2002 | Drnevich et al. | 60/39.53 |
| 6,397,787 B1 * | 6/2002 | Yamada et al. | 122/367.1 |
| 6,401,459 B1 * | 6/2002 | Tiras | 60/736 |

* cited by examiner

*Primary Examiner*—Charles G. Freay
(74) *Attorney, Agent, or Firm*—Howrey, Simon, Arnold & White, LLP

(57) ABSTRACT

Syngas for use, as fuel in the combustion turbine of an IGCC process is heated to a maximum temperature of about 350° F. (177° C.) prior to entering the combustor. Non-combustible diluent gas and additional fuel with a high heating value is also added to the syngas to increase the total heating value of the feed to the combustor of the gas turbine. The cooler temperature allows for more mass flow to the combustion turbine, allowing for greater sensible heat in the syngas to offset the latent heat loss due to the cooler temperature. Because the syngas/diluent feed steam is not heated to the high temperatures disclosed in the prior art, the steam that would otherwise heat the feed stream is available for power generation in the steam turbine, increasing its individual power output and the overall power output of the IGCC process.

23 Claims, 2 Drawing Sheets

COMBUSTION TURBINE FUEL INLET TEMPERATURE MANAGEMENT FOR MAXIMUM POWER OUTLET

BACKGROUND OF THE INVENTION

Integrated gasification combined cycle (IGCC) power generation systems are used throughout the world to generate power from the gasification of a fuel source. In such systems, a raw synthesis gas (or syngas) fuel gas stream, comprising $H_2$, CO, $CO_2$, and $H_2O$, is produced by the partial oxidation reaction of a hydrocarbonaceous fuel with a free-oxygen containing gas, typically in the presence of a temperature moderator such as steam, in a quench gasification reactor.

The syngas produced is cooled by quenching in water to produce a stream of quenched saturated syngas at a temperature typically in the range of about 450° F. to 550° F. and typically at a pressure of about 700 to 1500 psia. A more detailed description of one such process appears in U.S. Pat. No. 5,345,756.

The syngas produced is then generally cooled to a temperature of 40° F. to 140° F. and purified in an acid gas removal unit employing a physical or chemical solvent to remove $H_2S$ and COS from the syngas stream. The purified syngas is mixed with a diluent gas, such as nitrogen gas or water vapor, and then fed to the combustor of a gas turbine for power production. The mass flow of the diluent gas helps to increase the power generation and reduce NOx gasses produced by the combustion of the syngas in the gas turbine combustor. It is desirable in prior art IGCC processes to superheat the syngas/diluent mixture to its maximum attainable temperature, usually between 350° F. and 1000° F., prior to being introduced into the gas turbine combustor. This heating is commonly done with high or low pressure steam. The thermal energy introduced to the syngas/diluent mixture through superheating is combined with the chemical energy released by the syngas upon combustion. The hot gasses from the combustion are sent to an expander/generator that converts the energy released from the gas into electricity.

An air and nitrogen integrated IGCC system is usually preferred because of the potential for operation at maximum overall efficiency. Air is compressed in a gas turbine air compressor, usually located along the same shaft as the aforementioned combustion gas expander. A portion of compressed air is combusted with the syngas in the gas turbine combustor. The remaining portion, the extracted air, is cooled against the gas turbine diluent stream and fed to an air separation unit (ASU) that provides oxygen to the gasification step and nitrogen as diluent to the gas turbine.

Finally, waste heat from the gas turbine is then commonly used to produce steam, usually in a heat recovery steam generator (HRSG). The produced steam is commonly used as the temperature moderator in the gasification unit or to superheat the syngas/diluent feed stream to the gas turbine, with the balance of the steam generally used in a steam turbine for further power production. Various modifications on this general prior art process can be found in U.S. Pat. Nos. 5,715,671, 5,345,756, 5,117,623 and 5,078,752.

As stated, prior art IGCC processes find it desirable to heat the syngas/diluent to its maximum sustainable temperature prior to combustion in the gas turbine. For example, in U.S. Pat. No. 5,715,671, the syngas is heated to 390° C. (734° F.) before being passed to the gas turbine. In U.S. Pat. No. 5,345,756, the syngas is treated to a temperature in the range of about 350° F. (177° C.) to 1000° F. (538° C.) prior to entering the combustor. U.S. Pat. No. 5,117,623 prefers the syngas to be heated to 200° C. (392° F.). Finally, U.S. Pat. No. 5,078,752 contemplates syngas temperatures of 1,800° F. to 1,900° F., and possibly temperatures between 2,000° F. and 2,300° F.

Often times, the syngas heating is done with steam. The steam used to heat the syngas is thus not available to the steam turbine for additional power production. Furthermore, during high ambient temperature conditions it is sometimes desirable to add additional steam injection to, the syngas to obtain a higher power output from the combustion turbine. However, the additional steam injection unacceptably lowers flame stability. It is economically important to maximize electrical generating capacity at high ambient conditions since the price of power at high ambient temperatures can be up to 100 times that at low ambient temperatures. Thus, it would be desirable to develop an IGCC process wherein the cooler syngas is used in the combustor of the gas turbine, and not preheated with steam, so :hat more steam is available for power generation in the steam turbine.

SUMMARY OF THE INVENTION

The present invention is directed toward a process wherein the syngas and diluent gas is heated to about 100° F. to 200° F. above its dew point, a maximum temperature of about 350° F. (177° C.). Additional fuel with a high heating value, such as natural gas, is added to the syngas to increase the total heating value of the feed to the combustor of the gas turbine. Because of the lower temperature of the syngas/diluent feed stream, the natural gas and diluent flowrates are increased to maintain the power output of the gas turbine. Although the addition of the diluent is necessary to reduce harmful NOx gasses produced in the combustor, it also decreases the flame stability of the combustor. The addition of the natural gas is used to elevate the heating value, keeping the flame in the combustor stable, so that the additional diluent gas can still be injected into the syngas.

Because the syngas/diluent feed stream is not heated to the high temperatures disclosed in the prior art, the excess steam that would otherwise heat the feed stream is available for power generation in the steam turbine, increasing its individual power output and the overall power output of the IGCC process.

Another objective of the present invention provides an alternative use for the extracted air. Nitrogen from the air separation unit, used as the diluent stream, is usually supplied at about 280° F. (138° C.), and is usually heated to the same temperature as the syngas feed to the gas turbine combustor. Usually, this is in the temperature range of 350° F. (177° C.) to 1000° F. (538° C.) or greater. In the present invention, the diluent stream only needs to be heated to 100° F. to 200° F. above its dew point, or a maximum temperature of about 350° F. (177° C.). Because most of the heat from the extracted air will not be used to heat the gas turbine diluent stream, the heat can be used to produce low to medium pressure steam. This additional steam generation can be used in the gasification unit, allowing for more steam from the HRSG to be used for power generation in the steam turbine.

Because of the increased power production in the steam turbines, the total IGCC power production can be increased from 5–10%.

DESCRIPTION OF ILLUSTRATIVE EMBODIMENTS

Figure 1:
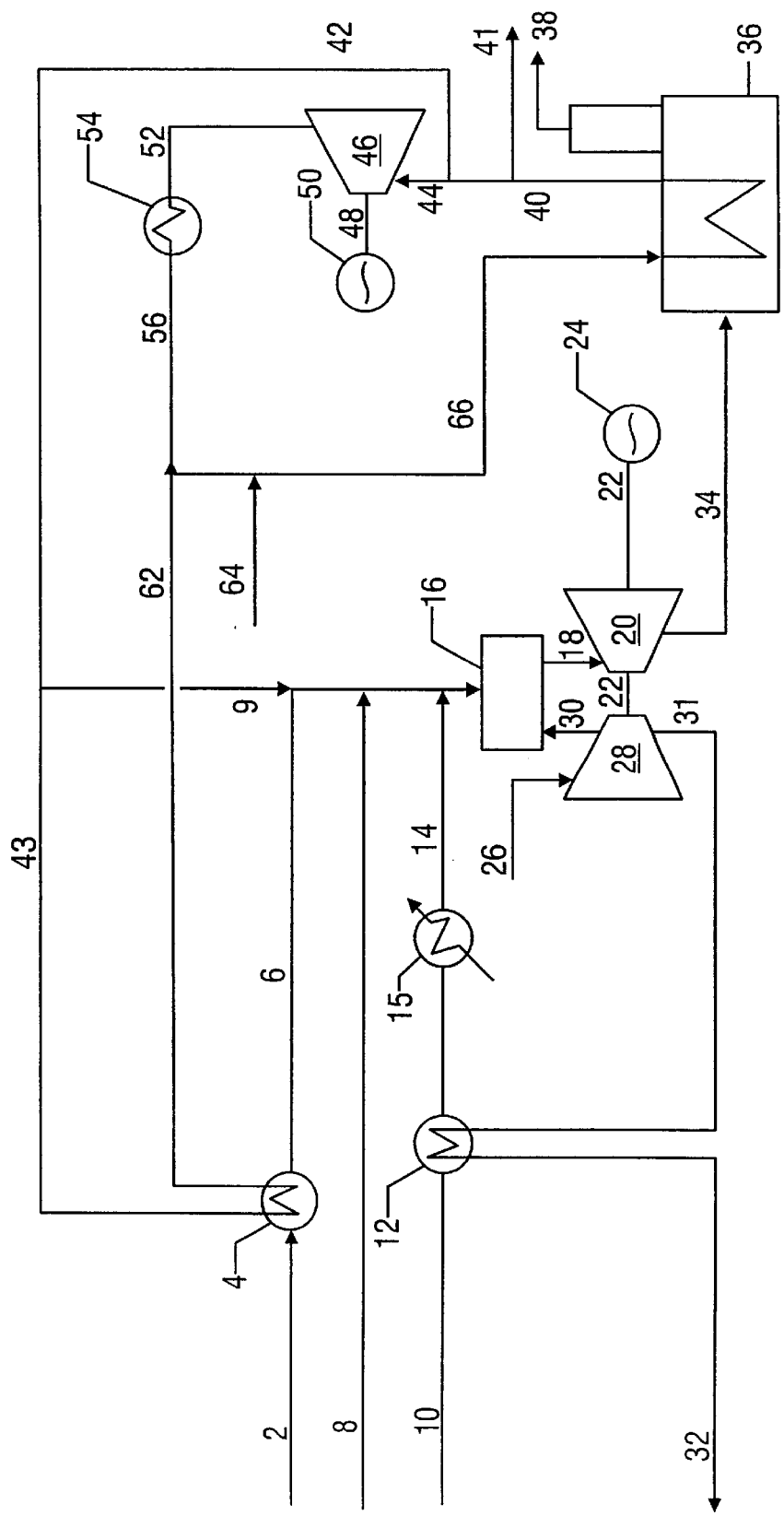
FIG. 1 illustrates a common prior art IGCC process.

In the instant invention, carbonaceous fuel is first obtained and prepared for feeding to a gasification reactor. Carbonaceous fuel is any solid, liquid, or gaseous combustible organic material that can be used as feedstock to a gasification process to produce synthesis gas production. The feedstock for a gasification process is usually a hydrocarbonaceous material, that is, one or more materials, generally organic, which provide a source of hydrogen and carbon for the gasification reaction. The hydrocarbonaceous material can be in a gaseous, liquid or solid state, or in a combination as desired, for example, a solid-liquid composition in a fluidized state.

The feed preparation step may not be necessary, given the composition and physical nature of the feedstock. Generally, solid carbonaceous fuels will need to be liquefied with oil or water prior to feeding to the gasifier. Liquid and gaseous carbonaceous fuels may be suitable for direct feed to the gasifier, but can be pre-treated for removal of any impurities that might be present in the feed.

The term liquid hydrocarbonaceous fuel as used herein to describe various suitable feedstocks is intended to include pumpable liquid hydrocarbon materials and pumpable liquid slurries of solid carbonaceous materials, and mixtures thereof. For example, pumpable aqueous slurries of solid carbonaceous fuels are suitable feedstocks. In fact, substantially any combustible carbon-containing liquid organic material, or slurries thereof may be included within the definition of the term "liquid hydrocarbonaceous." For example, there are:

(1) pumpable slurries of solid carbonaceous fuels, such as coal, particulate carbon, petroleum coke, concentrated sewer sludge, and mixtures thereof, in a vaporizable liquid carrier, such as water, liquid $CO_2$, liquid hydrocarbon fuel, and mixtures thereof, (2) suitable liquid hydrocarbon fuel feedstocks to the gasifier, is intended to include various materials, such as liquefied petroleum gas, petroleum distillates and residua, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operations, furfural extract of coker gas oil, and mixtures thereof, (3) also included within the definition of the term liquid hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials, and mixtures thereof.

Gaseous hydrocarbonaceous fuels that may be burned in the partial oxidation gasifier alone or along with the liquid hydrocarbonaceous fuel includes vaporized liquid natural gas, refinery off-gas, $C_1$–$C_4$ hydrocarbonaceous gases, and waste carbon-containing gases from chemical processes.

After the feed preparation step, if used, the carbonaceous fuel is sent to a gasification reactor, or gasifier. In the gasifier, the carbonaceous fuel is reacted with a reactive free oxygen-containing gas. The term free-oxygen containing gas as used herein means air, oxygen-enriched air i.e. greater than 21 mole % $O_2$, and substantially pure oxygen, i.e. greater than about 90% mole oxygen (the remainder usually comprising $N_2$ and rare gases). Substantially pure oxygen is preferred, such as that that is produced by an air separation unit (ASU). The partial oxidation of the hydrocarbonaceous material is completed, advantageously in the presence of a temperature control moderator such as steam, in a gasification zone to obtain hot synthesis gas, or syngas. Syngas and synthesis gas can and are used interchangeably throughout this specification.

The need for a temperature moderator to control the temperature in the reaction zone of the gas generator depends in general on the carbon-to-hydrogen ratios of the feedstock and the oxygen content of the oxidant stream. A temperature moderator is commonly used with liquid hydrocarbon fuels with substantially pure oxygen. Water or steam is the preferred temperature moderator. Steam may be introduced as a temperature moderator in admixture with either or both reactant streams. Alternatively, the temperature moderator may be introduced into the reaction zone of the gas generator by way of a separate conduit in the feed injector. Other temperature moderators include $CO_2$-rich gas, nitrogen, and recycled synthesis gas.

A gasification reactor generally comprises a reaction zone, made up of a vertical cylindrically shaped steel pressure vessel lined with refractory, and a quench chamber, such as shown in U.S. Pat. No. 2,809,104, which is incorporated herein by reference. A feed injector, such as shown in U.S. Pat. No. 2,928,460, which is incorporated herein by reference, may be used to introduce the feed streams into the reaction zone. In the reaction zone of a gasifier, the contents will commonly reach temperatures in the range of about 1,700° F. (927° C.) to 3,000° F. (1649° C.), and more typically in the range of about 2,000° F. (1093° C.) to 2,800° F. (1538° C.). Pressure will typically be in the range of about 1 atmospheres (101 kPa) to about 250 atmospheres (25331 kPa), and more typically in the range of about 15 atmospheres (1520 kPa) to about 150 atmospheres (15,199 kPa), and even more typically in the range of about 60 atmospheres (6080 kPa) to about 80 atmospheres (8106 kPa). See U.S Pat. No. 3,945,942 describing a partial oxidation feed injector assembly. See U.S. Pat. No. 5,656,044 describing a method and an apparatus for the gasification of organic materials. See also U.S. Pat. Nos. 5,435,940, 4,851,013, and 4,159,238 describing a few of the many gasification processes known in the prior art. The entire disclosures of the above referenced patents are hereby incorporated by reference and relied upon.

The hot gasification process product synthesis gas, or syngas, comprises carbon monoxide and hydrogen. Other materials often found in the synthesis gas include hydrogen sulfide, carbon dioxide, ammonia, cyanides, and particulates in the form of carbon and trace metals. The extent of the contaminants in the feed is determined by the type of feed and the particular gasification process utilized as well as the operating conditions. In any event, the removal of these contaminants is preferable to make gasification a viable process, and acid gas (e.g. $CO_2$ and $H_2S$) removal is very advantageous.

As the synthesis gas is discharged from the gasifier, it passes into the gasification quench chamber for cleaning. The turbulent condition in the quench drum, caused by large volumes of gases bubbling up through the water helps the water to scrub much of the solids from the effluent gas. Large quantities of steam are generated within the quench vessel and saturate the syngas stream. The stream of raw gas is cooled in the quench drum and leaves at a temperature in the range of about 350° F. to 600° F. (about 175° C. to 315° C.), such as about 450° F. to 550° F. (about 230° C. to 290° C.), and a pressure in the range of about 500 to 2500 psia, such as about 1000 psia. Advantageously, fresh quench water is a mixture of make-up water and condensate produced subsequently in the process.

The syngas can optionally be subjected to further cooling and cleaning operations involving a scrubbing technique wherein the syngas is introduced into a scrubber and contacted with a water spray which further cools the syngas and removes particulates and ionic constituents from the synthesis gas. The initially cooled gas is then treated to desulfurize the gas prior to utilization of the synthesis gas.

The synthesis gas is then sent to an acid gas removal unit so that the sulfur impurities in the syngas can be removed. The acid gas removal facilities for the synthesis gas, usually employing amine or physical solvents, removes the acid gases, particularly hydrogen sulfide, from the mixed synthesis gas/purge gas stream. The acid gas removal facilities typically operate at low temperatures. After the synthesis gas is cooled to below about 130° C., preferably below about 90° C., the contaminants in the gas, especially sulfur compounds and acid gases can be readily removed. The synthesis gas is contacted with the solvent in an acid gas removal contactor. The contactor may be of any type known to the art, including trays or a packed column. Operation of such an acid removal contactor is known in the art. Hydrogen sulfide from the acid gas removal unit is usually routed to a sulfur recovery process, with any recovered carbon dioxide being vented to the atmosphere.

The syngas can then be utilized for power generation. The syngas is only slightly superheated to about 100° F. to 200° F. above its dew point, or about 350° F. maximum, as opposed to being heated to is maximum temperature as is done in prior art processes, sometimes in excess of 1000° F. The syngas is then combusted and the combusted gas is expanded to produce power by am electric generator driven by an expansion turbine. The heating value and the composition of the syngas is an important consideration when using it for power production. Thus, additional high heating value fuel, such as natural gas, may need to be added to the syngas to increase the heating value of the combustor feed stream.

Supplementing the syngas gas turbine fuel with a non-combustible gas heat carrier, or diluent gas, to carry waste heat into the gas turbine will increase gas turbine efficiency. Such non-combustible heat carrier can be a gas such as nitrogen or carbon dioxide, or water vapor either evaporated into the fuel gas in a saturator device or injected directly as steam. The additional mass flow of the non-combustible gas permits the mixture of combustible fuel gas and non-combustible gas to contain more sensible heat at a given temperature and hence carry more heat into the gas turbine, improving its efficiency. Because of the lower temperature feed of the syngas and the diluent gas to the combustor, a greater mass flow of gas can be sent to the combustor for the same volumetric flowrate of gas. Thus, the greater mass flow rate of gas allows for additional sensible heat input into the combustor, offsets some of the latent heat loss that would be expected for feeding the gas at this lower temperature. Because of this, it is found that the steam that would otherwise heat the syngas and/or diluent gas can be used for power production, increasing the overall efficiency of the power production unit.

The non-combustible gas also provides other benefits such as a lowering of flame temperature and reducing $NO_x$ formation. Due to the introduction of saturated $N_2$ and saturated fuel gas, the concentration of oxides of nitrogen ($NO_x$) in the exhaust gas is substantially nil, below 20 ppm (vol) on dry 15% $O_2$ basis. The nitrogen is usually superheated to a temperature similar to that of the synthesis gas feed to the combustor. Thus, the present invention contemplates significant energy reduction to heat the nitrogen to about 350° F. or less instead of up to 1000° F. or more.

Air is also commonly added to the combustor feed stream. The air is compressed by means of a turbocompressor that is driven by the coaxial expansion turbine that, along with the combustor, are the principal parts of the gas turbine. The compressed air enters the combustor at a temperature: in the range of about 400° F. to 850° F. (about 425° C. to 455° C.) and at substantially the same pressure as syngas and diluent gas. A portion of compressed air can provide feed air to an air separation unit (ASU) that in turn provides oxygen to the gasification step and nitrogen diluent to the gas turbine. Before being fed to the ASU, though, a portion of the compressed air ASU feed can be used to heat the nitrogen diluent stream to its desired temperature. Because of the lower heat requirement to heat the $N_2$, a significant portion of the air is available to generate steam for use as the temperature moderator in the gasification reactor, to preheat the synthesis gas feed to the combustor, or can be used for additional power production in the steam cycle of the IGCC process. Thus, more steam produced in the subsequent heat recovery steam generator is now advantageously available for power production.

An ASU is used to separate air into separate streams of substantially pure oxygen gas and nitrogen gas. A portion or all of the nitrogen gas is saturated with water, slightly superheated, and introduced into the combustor of a gas turbine along with the stream of syngas and natural gas. The stream of oxygen gas from the ASU is usually introduced into the reaction zone of the partial oxidation gas generator by way of one passage in an annulus-type feed injector.

The hot exhaust gas leaving the expansion turbine portion of the gas is passed through a conventional heat recovery steam generator (HRSG) prior to being discharged to the atmosphere. Steam for operating a conventional steam turbine comprising a high pressure expansion turbine in tandem with a coaxial intermediate expansion turbine, and steam for process needs, is produced in the HRSG. For example, superheated high pressure steam from the HRSG can be introduced into a high pressure expansion turbine (HPT) for power production. Intermediate pressure exhaust steam leaves the HPT and can also be superheated in the HRSG, and introduced into an intermediate pressure expansion turbine (IPT) to produce additional power. Power production using steam is very similar to power production using combusted gas. The steam is expanded through expansion turbines, driving electric generators to produce of electricity. It may be necessary to use a portion of the produced steam to heat the syngas and/or diluent feed stream to the gas turbine, for injection to the gasification reactor as a temperature moderator, or for addition as diluent to the gas turbine combustor. Because the temperature requirements for these syngas and diluent streams are much lower, and because hot air is available to both heat the diluent stream and produce extra steam, a majority of the steam is available for use in the steam turbines for power production.

FIG. 1 shows a common prior art IGCC process. In this process, synthesis gas 2, usually produced in a gasification reactor known in the art and purified to remove any sulfur compounds in the synthesis gas, is preheated to its maximum attainable temperature, usually 1000° F. or greater, using steam 43 in heat exchanger 4. The heated synthesis gas 6 is optionally combined with natural gas 8, optional steam 9, and heated water saturated nitrogen 14, which is usually heated to substantially the same temperature as the synthesis gas. Heated nitrogen 14 generally is supplied from an air separation unit at about 280° F. (not shown), saturated with water, and supplied as saturated nitrogen stream 10, is heated with hot air 31 in heat exchanger 12, and can be further heated in exchanger 15 using steam to reach the elevated syngas temperature. The combination of the synthesis gas 6, the optional natural gas 8, and the heated nitrogen 14 is sent in combination with compressed air 30 to the combustor 16 of a gas turbine.

The combustion gas product 18 is expanded in an expander 20, which turns shaft 22. Shaft 22 allows for power production in generator 24, as well as supplying the means to compress the air stream 26 The air stream 26 is compressed in compressor 28 attached to shaft 22. A portion of the compressed air 30 is sent to the combustor, providing oxygen for the combustion of the synthesis gas. The remaining compressed air 31 is used to first heat nitrogen stream 10, and then is usually sent to the aforementioned air separation unit via line 32.

After being expanded in the expander 20, the combustion gases are passed through line 34. to the heat recovery steam generator (HRSG) 36, and eventually are released to the atmosphere through stack 38. Here, boiler feed water 66 is converted into steam 40 using heat from the combustion gases 34. Some of the steam is sent through line 41 to the gasification unit to act as the temperature moderator. A portion of the steam 42 is used to preheat the synthesis gas in exchanger 4 and supply optional steam 9 to the combustor, while the remaining portion 44 is expanded in expander 46 to produce power in generator 50. The expanded steam 52 is condensed in exchanger 54, and combined with the condensed steam 62 that was used to preheat the synthesis gas. Makeup boiler feed water 64 is added to the condensed steam stream, and sent back to the HRSG 36 through line 66.

Figure 2:
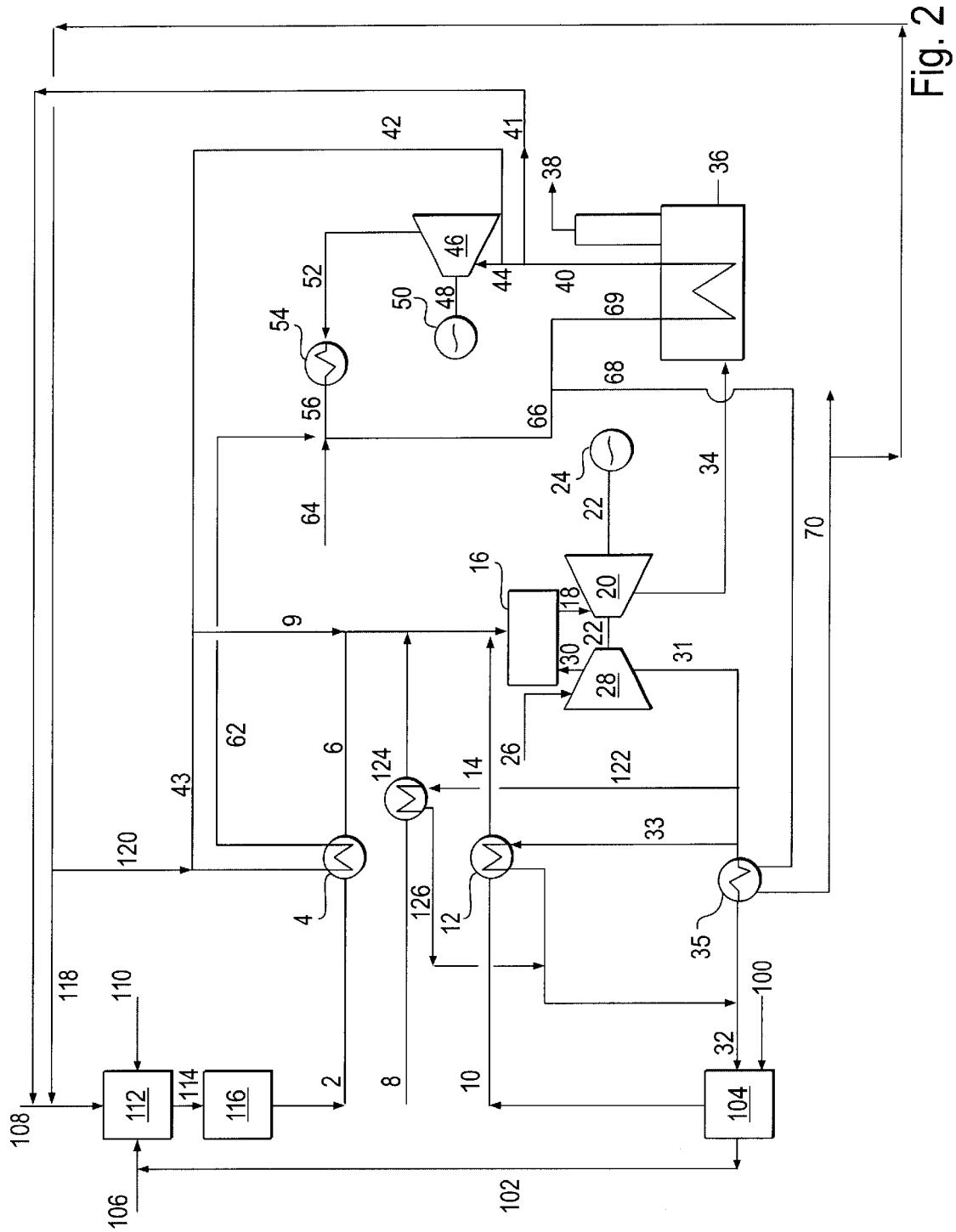
FIG. 2 shows one embodiment of the present invention.

FIG. 2 sets forth one embodiment of the present invention. For simplicity sake, the same numbers are used as in FIG. 1, where applicable. In this process, synthesis gas 2, usually produced in a gasification reactor known in the art and purified to remove any sulfur compounds in the synthesis gas. The synthesis gas is not preheated to its maximum attainable temperature, but instead is heated to 100° F. to 200° F. above its dew point, or a maximum temperature of about 350° F. The additional steam that would otherwise be used to preheat the synthesis gas to much higher temperatures is thus eliminated and available for power production. The synthesis gas 6 is combined with natural gas 8, optional steam 9, and heated water saturated nitrogen 14, which is heated to substantially the same temperature as the synthesis gas. Heated nitrogen 14 generally is supplied from an air separation unit at about 280° F. (not shown), saturated with water (not shown), supplied as nitrogen stream 10, and then heated with hot air 33 in heat exchanger 12. Steam heating of the nitrogen is no longer necessary because the nitrogen can be supplied to the combustor at a lower temperature. The combination of the synthesis gas 6, the natural gas 8, optional steam 9, and the heated nitrogen 14 is sent in combination with compressed air 30 to the combustor 16 of a gas turbine.

The combustion gas product 18 is expanded in an expander 20, which turns shaft 22. Shaft 22 allows for power production in generator 24, as well as supplying the means to compress the air stream 26. The air stream 26 is compressed in compressor 28 attached to shaft 22. A portion of the compressed air 30 is sent to the combustor, providing oxygen for the combustion of the synthesis gas. The remaining compressed air 31 is then processed to recover the excess heat in the compressed air. A portion of the compressed air 33 is used to heat nitrogen stream 10. Because the nitrogen does not need to be heated to as high a temperature as is done in prior art process, some hot compressed air is available for steam production. Thus, a second portion of the compressed air 31 exchanges heat with boiler feed water 68 in heat exchanger 35. This produces additional steam 70 that can be used in the gasification reactor or to preheat the syngas feed to the combustor, replacing the valuable power-producing steam that is normally used in prior art processes. After being used as a heat transfer medium, the air is then preferably sent to the aforementioned air separation unit via line 32.

After being expanded in the expander 20, the combustion gases are passed through line 34 to the heat recovery steam generator (HRSG) 36, and eventually are released to the atmosphere through stack 38. Here, boiler feed water 69 is converted into steam 40 using heat from the combustion gases 34. The steam needed to preheat the synthesis gas is reduced or eliminated if steam stream 70 is used to preheat the synthesis gas. Although steam may need to be supplied to the gasifier via line 41, this could be replaced using steam stream 70. Some steam, though, can still be supplied as steam 9 to the combustor 16 of the gas turbine to maximize its power output. Nevertheless, most of the steam produced is expanded in expander 46 to produce power in generator 50. The expanded steam 52 is condensed in exchanger 54, and combined with makeup boiler feed water 64 is added to the condensed steam stream, and sent back to the HRSG 36 through line 66. A portion of the boiler feed water is sent via line 68 to exchanger 35 where it is converted into steam 70 using the hot compressed air stream 31. The steam product 70 can then be used in the gasification reactor or to preheat the synthesis gas feed to the combustor, therefore eliminating the need to use steam produced in the steam power generation, loop/HRSG for that purpose. Steam 70 can also alternatively be used to produce additional power in the steam cycle of the IGCC process.

The above illustrative embodiments are intended to serve as simplified schematic diagrams of potential embodiments of the present invention. One of ordinary skill in the art of chemical engineering should understand and appreciate that specific details of any particular embodiment may be different and will depend upon the location and needs of the system under consideration. All such layouts, schematic alternatives, and embodiments capable of achieving the present invention are considered to be within the capabilities of a person having skill in the art and thus within the scope of the present invention.

While the apparatus, compounds and methods of this invention have been described in terms of preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention.

What is claimed is:

1. A process comprising heating a mixture of fuel gas and diluent gas to a temperature between about 100° F. to about 200° F. above the mixture's dew point and feeding the mixture to the combustor of a gas turbine.

2. The process of claim 1 wherein the mixture is heated to a maximum temperature of about 350° F.

3. The process of claim 1 wherein the fuel gas is syngas produced in a gasification reactor.

4. The process of claim 3 wherein liquid hydrocarbonaceous fuel is reacted in the gasification reactor with a free-oxygen containing gas and a temperature moderator to produce the syngas.

5. The process of claim 4 wherein the syngas is treated in an acid gas removal unit.

6. The process of claim 1 wherein the diluent gas is selected from the group consisting of nitrogen, carbon dioxide, and water vapor.

7. The process of claim 1 wherein the diluent gas is nitrogen produced by an air separation unit.

8. The process of claim 1 wherein the mixture further comprises a high heating value fuel.

9. The process of claim 8 wherein the high heating value fuel is natural gas.

10. The process of claim 1 wherein the mixture further comprises air.

11. The process of claim 1 wherein the combustor product is hot exhaust gas, the hot exhaust gas then being processed in a heat recovery steam generator so as to reduce the temperature of the hot exhaust gas by producing steam in the heat recovery steam generator.

12. The process of claim 11 wherein the steam is expanded so as to produce power.

13. The process of claim 1 wherein the combustor product is hot exhaust gas, the hot exhaust gas then being expanded in an expander so as to produce electric power.

14. The process of claim 13 wherein the expander drives a turbocompressor used to compress air.

15. The process of claim 14 wherein a portion the compressed air from the turbocompressor is injected into the combustor.

16. The process of claim 14 wherein a portion the compressed air from the turbocompressor is used to generate steam by heating a stream of water.

17. The process of claim 16 wherein the steam is used as a temperature moderator in a gasification reactor.

18. The process of claim 16 wherein the steam is used to produce power.

19. The process of claim 14 wherein a portion the compressed air from the turbocompressor is used to heat the fuel gas.

20. The process of claim 14 wherein a portion of the compressed air from the turbocompressor is fed to an air separation unit, wherein the air separation unit separates air into an oxygen stream and a nitrogen stream.

21. The process of claim 20 wherein the nitrogen is heated by the portion of the compressed air from the turbocompressor that is fed to the air separation unit prior to the portion of compressed air from the turbocompressor being fed to the air separation unit.

22. The process of claim 1, wherein the mixture is heated by individually heating the fuel gas prior to mixing the fuel gas with the diluent gas.

23. The process of claim 1, wherein the mixture is heated by individually heating the diluent gas prior to mixing the diluent gas with the fuel gas.

* * * * *